United States Patent
Yamaguchi

(10) Patent No.: US 10,401,895 B2
(45) Date of Patent: Sep. 3, 2019

(54) ROTATIONAL STRUCTURE FOR ROTARY KNOB

(71) Applicant: Onkyo Corporation, Osaka (JP)

(72) Inventor: Shinji Yamaguchi, Osaka (JP)

(73) Assignee: Onkyo Corporation, Osaka (JP)

( * ) Notice: Subject to any disclaimer, the term of this patent is extended or adjusted under 35 U.S.C. 154(b) by 0 days.

(21) Appl. No.: 15/198,100

(22) Filed: Jun. 30, 2016

(65) Prior Publication Data

US 2017/0003705 A1 Jan. 5, 2017

(30) Foreign Application Priority Data

Jun. 30, 2015 (JP) .................................. 2015-130610

(51) Int. Cl.
*F16F 13/02* (2006.01)
*G05G 1/10* (2006.01)
(Continued)

(52) U.S. Cl.
CPC ................ *G05G 5/03* (2013.01); *F16F 13/02* (2013.01); *G05G 1/08* (2013.01); *G05G 1/10* (2013.01);
(Continued)

(58) Field of Classification Search
CPC .......... B60K 37/06; G05G 1/10; G05G 23/00; G05G 5/03; G05G 1/08; F16F 13/02
See application file for complete search history.

(56) References Cited

U.S. PATENT DOCUMENTS 2,509,058 A * 5/1950 Haury ...................... G05G 1/10
338/162
2,660,904 A * 12/1953 Hilsinger, Jr. ........... G05G 5/26
200/330

(Continued)

FOREIGN PATENT DOCUMENTS

DE 1 472 374 A 12/1968
DE 10 2004 040 515 A1 2/2006
(Continued)

OTHER PUBLICATIONS

EPO Machine Translation of JP2010257711 (A), Taguchi et al., Nov. 2010.*
(Continued)

*Primary Examiner* — Vinh Luong
(74) *Attorney, Agent, or Firm* — Renner Otto Boisselle & Sklar, LLP

(57) ABSTRACT

Provided is a rotary knob rotational structure being less susceptible to the influence of variation in the dimensions of a rotary knob and reducing backlash of the rotary knob while providing a suitable magnitude of rotational resistance to the rotary knob.
The rotary knob rotational structure includes an annular sheet 22 interposed between a device body and the rotary knob 14, an attachment member 24 configured to attach a fixed portion 22a of the annular sheet 22 to the device body with the fixed portion 22a being interposed between the attachment member 24 and the device body, and a body-side protrusion 26 contacting the annular sheet 22 on the outside of the fixed portion 22a in the radial direction of the annular sheet 22 to warp the annular sheet 22 toward the rotary knob 14.

17 Claims, 7 Drawing Sheets

(51) Int. Cl.
- *G05G 5/03* (2008.04)
- *H01H 19/14* (2006.01)
- *G05G 1/08* (2006.01)
- *G05G 23/00* (2006.01)

(52) U.S. Cl.
CPC ......... *H01H 19/14* (2013.01); *F16F 2222/04* (2013.01); *F16F 2236/04* (2013.01); *G05G 23/00* (2013.01)

(56) References Cited

U.S. PATENT DOCUMENTS

| | | | | |
|---|---|---|---|---|
| 3,385,116 A | * | 5/1968 | Carlson | B41J 19/96 |
| | | | | 74/10.54 |
| 3,982,442 A | * | 9/1976 | Shiurila | G05G 1/10 |
| | | | | 116/233 |
| 4,036,079 A | * | 7/1977 | Pratt | G05G 1/10 |
| | | | | 74/531 |
| 4,417,483 A | * | 11/1983 | Howie, Jr. | G05G 1/10 |
| | | | | 116/309 |
| 5,952,628 A | * | 9/1999 | Sato | B60K 37/06 |
| | | | | 200/4 |
| 6,031,190 A | * | 2/2000 | Tokuda | B60K 37/06 |
| | | | | 200/11 R |
| 7,679,362 B2 | * | 3/2010 | Koski | H03K 17/9505 |
| | | | | 324/207.2 |
| 2009/0101217 A1 | * | 4/2009 | Ushigusa | G01F 1/36 |
| | | | | 137/511 |
| 2014/0230716 A1 | * | 8/2014 | Ishikawa | G05G 5/03 |
| | | | | 116/205 |
| 2014/0238183 A1 | * | 8/2014 | Mahida | H01H 3/10 |
| | | | | 74/553 |
| 2017/0060169 A1 | * | 3/2017 | Stroh | F16D 1/0847 |

FOREIGN PATENT DOCUMENTS

| | | | | |
|---|---|---|---|---|
| EP | 0580471 A1 | * | 1/1994 | |
| GB | 1416557 | * | 12/1973 | |
| JP | 08106336 A | | 4/1996 | |
| JP | 9-34575 A | * | 7/1997 | ............ G05G 5/03 |
| JP | 2002-062386 A | | 2/2002 | |
| JP | 2010-257711 | | 11/2010 | |
| JP | 2014-006701 A | | 1/2014 | |

OTHER PUBLICATIONS

EPO Machine Translation of JP2002062386 (A), Inaba, Feb. 28, 2002. (Year: 2002).*
EPO Machine Translation of JPH0934575 (A), Aikawa et al., Feb. 7, 1997. (Year: 1997).*
English Abstract of EP 0580471 A1, Sawczuk, Jan. 26, 1994. (Year: 1994).*
Define warp—Google Search, google.com., Nov. 10, 2018 (Year: 2018).*
Definition of Warp by Merriam-Webster, merriam-webster.com., Nov. 10, 2018 (Year: 2018).*
Define protrusion—Google Search, google.com., Nov. 11, 2018 (Year: 2018).*
Extended European Search Report dated Dec. 23, 2016 for corresponding European Application No. 16176811.4.

* cited by examiner

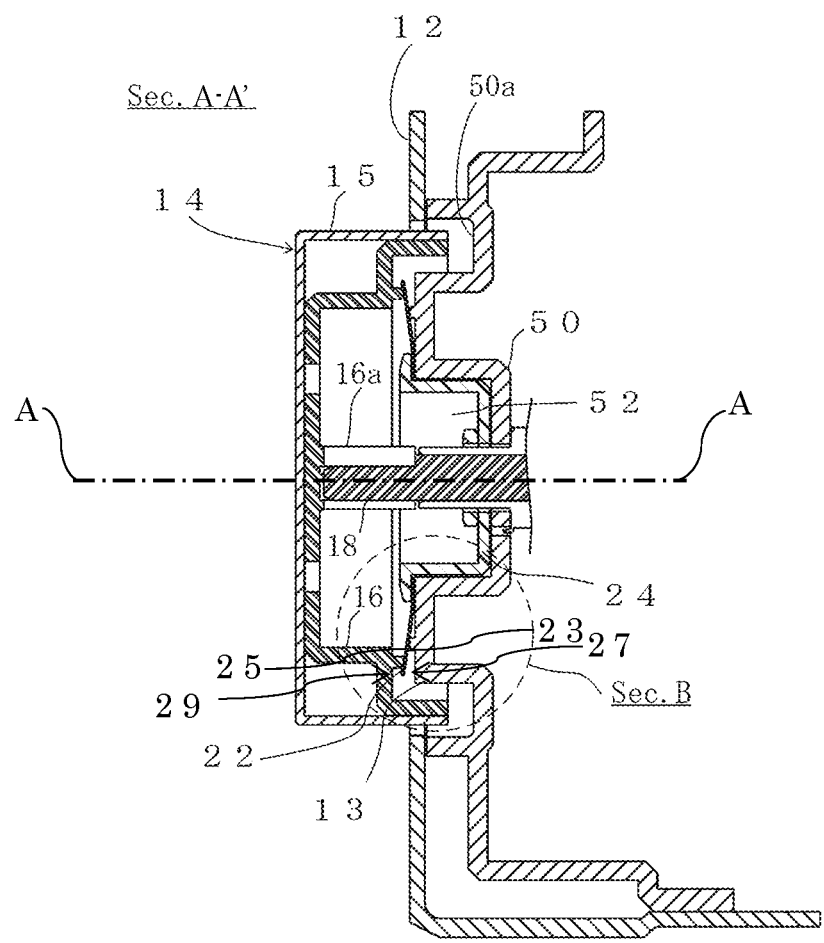

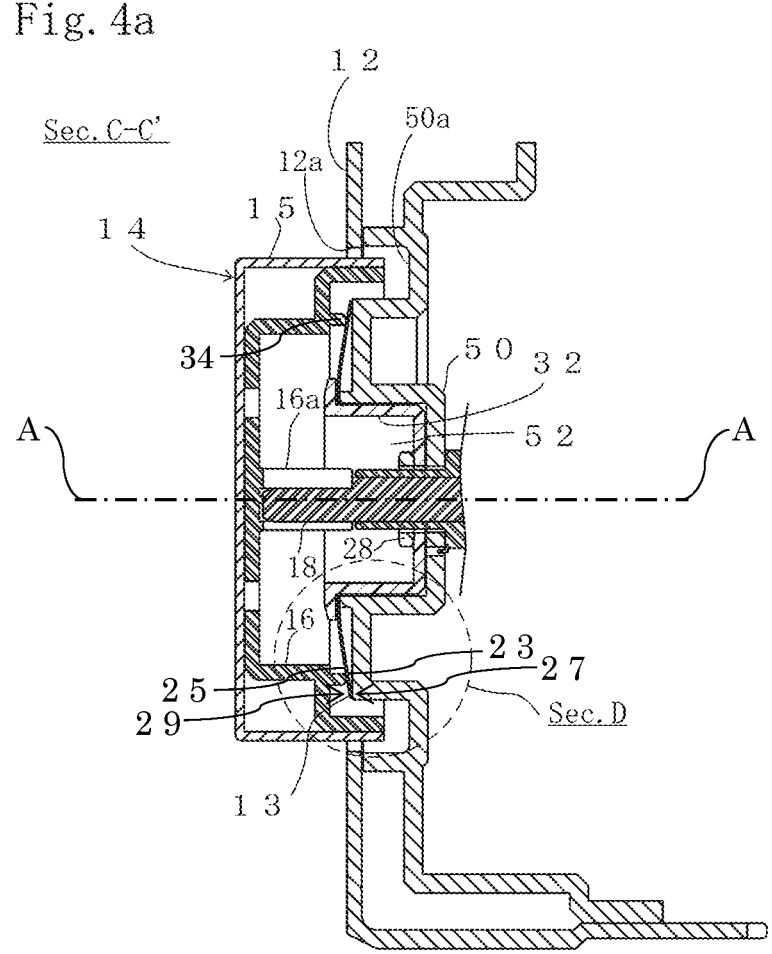

ROTATIONAL STRUCTURE FOR ROTARY KNOB

BACKGROUND OF THE INVENTION

1. Field of the Invention

The present invention relates to a rotary knob structure provided at a device body, and particularly relates to a rotational structure configured to provide rotational resistance to a rotary knob.

2. Description of the Related Art

For example, a rotary knob is attached to a body of, e.g., an audio device to perform various types of operation. Some of these rotary knobs are configured to provide a weighted operational feeling in such a manner that rotational resistance is provided while the rotary knob is rotating.

For example, JP-A-2010-257711 discloses a rotational structure for a rotary knob. In the rotational structure, an annular spacer as a stack of an elastic member and a sliding member is interposed in a clearance between a device body and the rotary knob. The annular spacer slides on the rotary knob to provide rotational resistance to the rotary knob. As a result, backlash of the rotary knob is reduced.

However, in the rotary knob rotational structure as disclosed in JP-A-2010-257711, the annular spacer is tightly interposed in the clearance between the device body and the rotary knob. For this reason, when the size of the clearance changes due to an influence such as variation in the dimensions of the rotary knob, the magnitude of rotational resistance also changes. Thus, it is difficult to provide a suitable magnitude of rotational resistance to the rotary knob.

SUMMARY OF THE INVENTION

The present invention is intended to provide a rotary knob rotational structure being less susceptible to the influence of variation or dispersion (In the following, a word "variation" is used.) in the dimensions of a rotary knob and reducing backlash or wobble (In the following, a word "backlash" is used.) of the rotary knob while providing a suitable magnitude of rotational resistance to the rotary knob.

A rotary knob rotational structure of one aspect of the present invention is a rotational structure for a rotary knob attached to a rotary shaft rotatably provided at a device body, the rotational structure providing rotational resistance to the rotary knob. The rotational structure includes an annular sheet interposed between the device body and the rotary knob, an attachment member configured to attach a fixed portion of the annular sheet to the device body with the fixed portion being interposed between the attachment member and the device body, and a body-side protrusion provided at the device body to contact the annular sheet on the outside of the fixed portion in the radial direction of the annular sheet to warp the annular sheet toward the rotary knob. The rotary knob contacts the annular sheet on the outside of the body-side protrusion in the radial direction of the annular sheet such that warpage of the annular sheet biases the rotary knob in the direction away from the device body, and is configured to be, in the biased state, slidable on the annular sheet such that the rotational resistance is provided to the rotary knob.

A rotary knob rotational structure of another aspect of the present invention is a rotational structure for a rotary knob attached to a rotary shaft rotatably provided at a device body, the rotational structure providing rotational resistance to the rotary knob. The rotational structure includes an annular sheet interposed between the device body and the rotary knob, an attachment member configured to attach a fixed portion of the annular sheet to the device body with the fixed portion being interposed between the attachment member and a protrusion of the device body, and a sliding portion provided at the rotary knob to contact the annular sheet on the outside of the fixed portion in the radial direction of the annular sheet to warp the annular sheet toward the device body. The rotary knob is biased in the direction away from the device body in such a manner that the annular sheet contacts the sliding portion, and in the biased state, the sliding portion slides on the annular sheet to provide the rotational resistance to the rotary knob.

According to the rotary knob rotational structure of one aspect of the present invention, the annular sheet interposed between the device body and the attachment member contacts the body-side protrusion to warp toward the rotary knob. Accordingly, the rotary knob is biased in the direction away from the device body, and in this biased state, slides on the annular sheet such that the rotational resistance is provided to the rotary knob. With this configuration, the biasing force of the annular sheet can reduce backlash of the rotary knob while a suitable magnitude of rotational resistance can be provided to the rotary knob. Moreover, since the rotary knob is biased in the direction away from the device body in the state in which the annular sheet warps, variation in the dimensions of the rotary knob can be absorbed according to the degree of warpage of the annular sheet. As a result, the influence of variation in the dimensions of the rotary knob can be reduced.

According to the rotary knob rotational structure of another aspect of the present invention, the annular sheet interposed between the device body and the attachment member warps toward the device body, and therefore, the annular sheet can bias the rotary knob in the direction away from the device body. Moreover, in this biased state, the sliding portion of the rotary knob slides on the annular sheet so that the rotational resistance can be provided to the rotary knob. With this configuration, the biasing force of the annular sheet can reduce backlash of the rotary knob while a suitable magnitude of rotational resistance can be provided to the rotary knob. Moreover, since the rotary knob is biased in the direction away from the device body in the state in which the annular sheet warps, variation in the dimensions of the rotary knob can be absorbed according to the degree of warpage of the annular sheet. As a result, the influence of variation in the dimensions of the rotary knob can be reduced.

BRIEF DESCRIPTION OF THE DRAWINGS

FIG. 1b and a perspective back view of the rotary knob of FIG. 1a;

FIG. 3a is a cross-sectional view of the rotary knob rotational structure of FIG. 1a, taken along line A-A' of FIG. 1a;

FIG. 3b is an enlarged view of Section B of the cross-sectional view of the rotary knob illustrated in FIG. 3a;

FIG. 4a is a cross-sectional view of a rotary knob rotational structure of a second embodiment of the present invention as similarly illustrated in FIG. 3a, with the view of FIG. 4a taken along a line C-C', which is a line located at the position of line A-A' of FIG. 1a, but relative to a second embodiment of the audio device having at least an alternative structure of an annular protrusion of a device body of the audio device; and FIG. 4b is an enlarged view of Section D of the cross-sectional view of the rotary knob illustrated in FIG. 4a.

DETAILED DESCRIPTION OF THE PREFERRED EMBODIMENTS

Embodiments of the present invention will be described in detail below with reference to attached drawings. In the description below, specific shapes, materials, numeric values, directions, etc. will be set forth for the sake of easy understanding of the present invention, and can be optionally changed depending on applications, purposes, specifications, etc. Moreover, in the case of including a plurality of embodiments or variations in the description made below, it is, from the beginning, conceivable that features of these embodiments or variations are optionally used in combination.

Figure 1A:
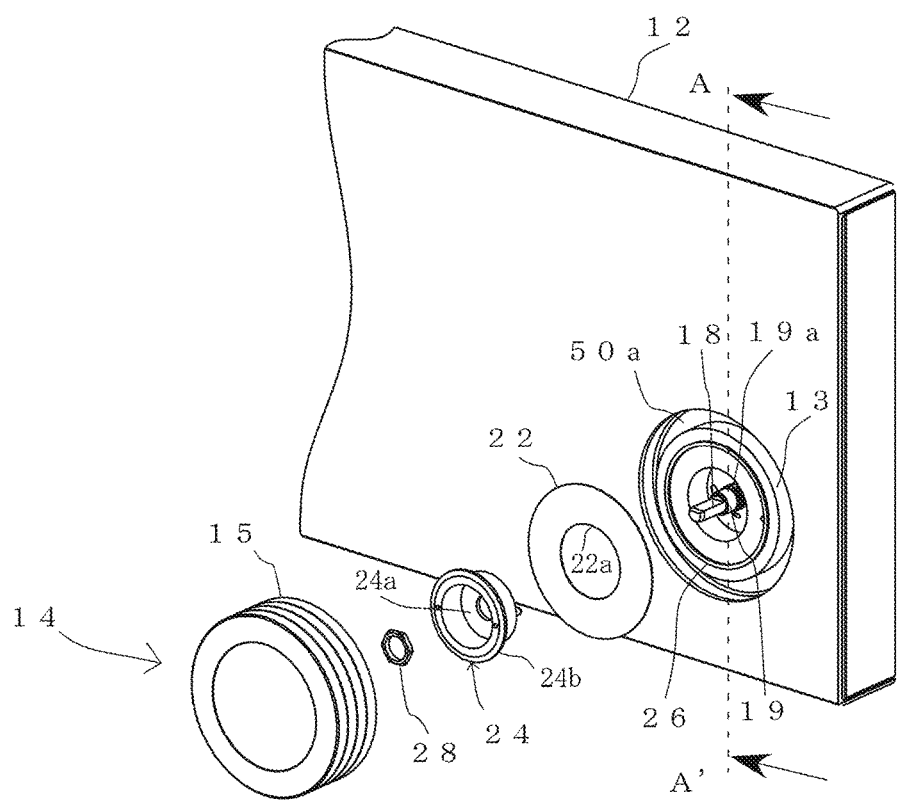
FIG. 1a is an exploded perspective view of an audio device having a rotary knob rotational structure of a first embodiment of the present invention.
Figure 1B:
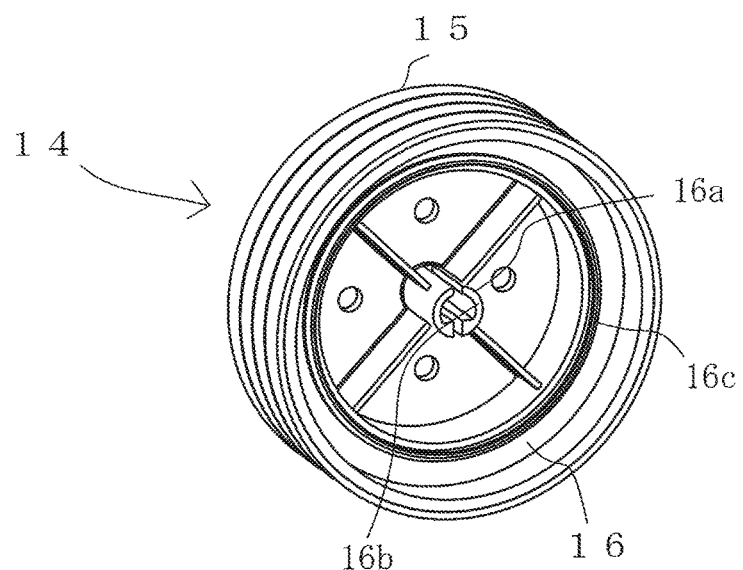

FIG. 1 is an exploded perspective view of an audio device having a rotary knob rotational structure of a first embodiment of the present invention, and also partially illustrates a rotary knob configuration on the back side thereof.

In, e.g., a body of the audio device, a rotary knob 14 is rotatably attached to a rotary shaft 18 fixed to a front panel 12 and protruding from the front panel 12, and has the function of adjusting, e.g., the volume of sound according to rotational displacement of the rotary knob 14, as illustrated in FIG. 1.

In the device body, an annular protrusion 13 formed around the rotary shaft 18 is provided. An annular sheet 22 is interposed between the annular protrusion 13 and an attachment member 24, and is fixed to the device body.

The annular sheet 22 is made of thin resin having flexibility, such as polycarbonate, polypropylene, or polyimide, and is formed in a flat plate shape or a dish shape. As will be described later, the annular sheet 22 provides rotational resistance to the rotary knob 14.

As illustrated in FIG. 1, the attachment member 24 is a cup-shaped resin member having the bottom at one end in the axial direction thereof, and at a center bottom portion thereof, is formed with an insertion hole 24a into which the rotary shaft 18 is inserted. At the other end of the attachment member 24, a flange portion 24b is provided. The flange portion 24b contacts the annular protrusion 13 of the device body via the annular sheet 22.

Figure 2:
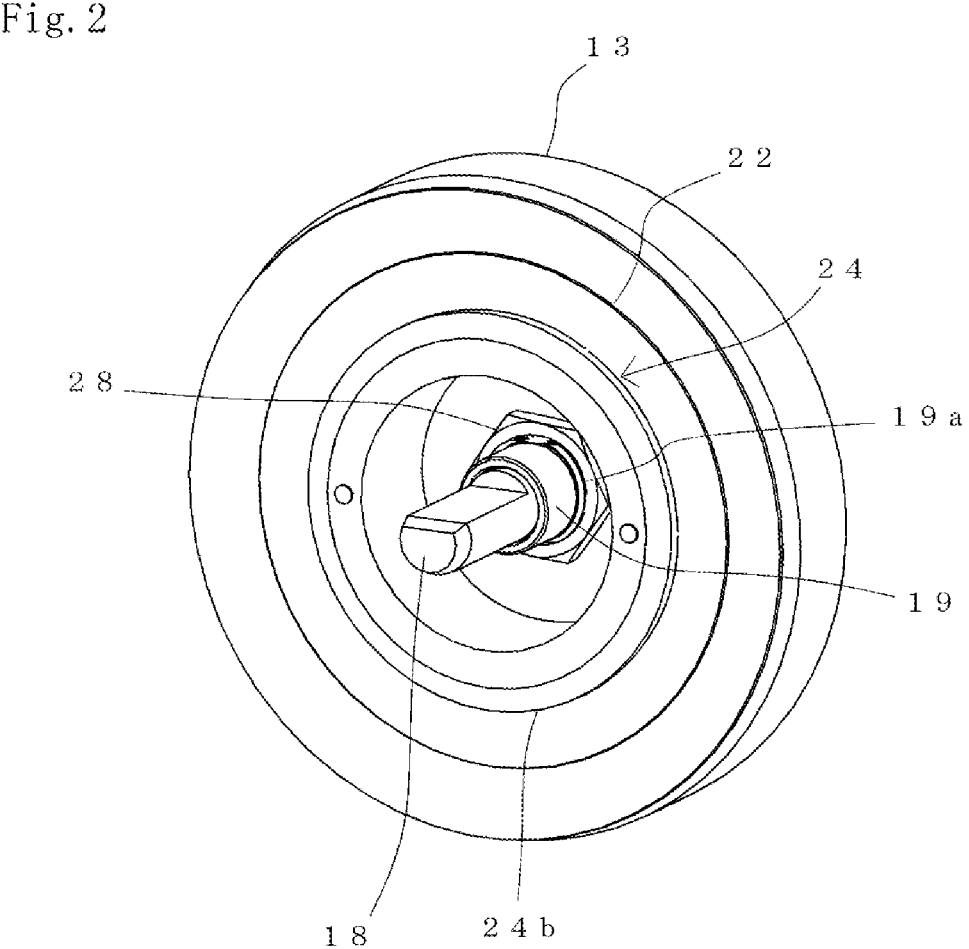
FIG. 2 is a perspective view of the state in which an attachment member and an annular sheet as illustrated in FIG. 1a are attached to a rotary shaft.

FIG. 2 is a perspective view of the state in which the attachment member 24 and the annular sheet 22 as described above are attached to the device body. The attachment member 24 is inserted onto the rotary shaft 18 with the annular sheet 22 being interposed between the attachment member 24 and the annular protrusion 13, and is fixed in such a manner that a nut 28 is screwed onto an external thread 19a of a cylindrical cover 19 from the front side. The attachment member 24 fixes a fixed portion 22a on the inside in the radial direction of the annular sheet 22 illustrated in FIG. 1 in the state in which the fixed portion 22a is interposed between the flange portion 24b and the annular protrusion 13. The rotary shaft 18 is freely rotatable by the rotary knob 14 in the cylindrical cover 19, but a predetermined magnitude of rotational resistance is provided to the rotary shaft 18 by the rotary knob 14 and the annular sheet 22.

Figure 3B:
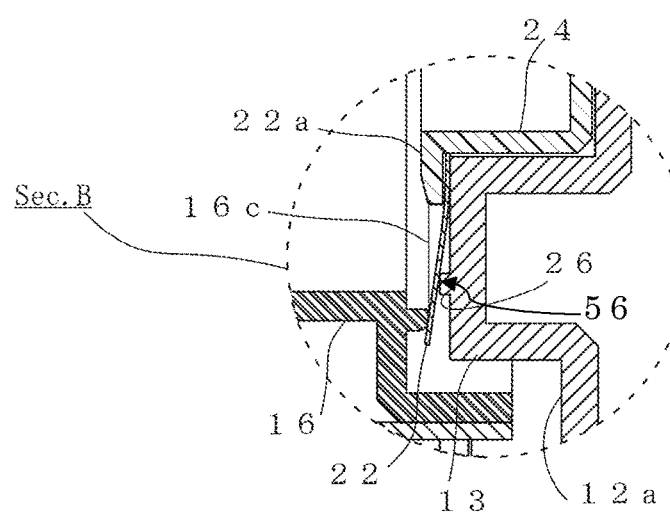

FIG. 3 is a cross-sectional view of the rotational structure of the rotary knob. The rotational structure and the function thereof will be described with reference to FIG. 3.

A case 50 of the body of the audio device of the present embodiment is fixed to the back side of the front panel 12. The annular protrusion 13 of the case 50 is exposed through an opening 12a of the front panel 12 on the front side, and the opening 12a forms a housing chamber where the rotary knob 14 is inserted into the front panel 12. The inner end of the rotary knob 14 further extends from the opening 12a of the front panel 12 toward an annular recess 50a of the case 50.

A cup-shaped receiver 52 of the case 50 is provided around the rotary shaft 18 protruding from the case 50 so that the attachment member 24 can be received. As shown in FIG. 3a, the rotary shaft 18 of the illustrated embodiments extends along an example of a central axis A of the rotary knob 14.

The nut 28 is fixed in such a manner that the nut 28 is screwed onto the external thread 19a of the cylindrical cover 19 disposed at the outer periphery of the rotary shaft 18. Thus, the attachment member 24 is firmly fixed in the cup-shaped receiver 52, and as described above, the fixed portion 22a of the annular sheet 22 is fixed with the fixed portion 22a being interposed between the annular protrusion 13 of the case 50 and the flange portion 24b of the attachment member 24.

As illustrated in FIG. 1, the rotary knob 14 includes an outer cylindrical portion 15 made of metal such as aluminum, and an inner cylindrical portion 16 fitted into the outer cylindrical portion 15 and made of, e.g., ABS resin. A columnar support 16a configured to fix the rotary knob 14 to the rotary shaft 18 is formed at the center of the inner cylindrical portion 16. The columnar support 16a is divided into two portions along the axial direction thereof, and a substantially D-shaped fixing hole 16b (see FIG. 1) is formed at the center of the columnar support 16a so that the rotary shaft 18 can be inserted into the fixing hole 16b and be fixed in the fixing hole 16b. A sliding portion 16c as annular ribs is formed on the back end surface of the inner cylindrical portion 16.

The mechanism for providing rotational resistance to the rotary knob 14 by the annular sheet 22 will be described below. A body-side protrusion 26 is formed on the end surface of the annular protrusion 13. The body-side protrusion 26 has the function of contacting the annular sheet 22 to warp the annular sheet 22 toward the rotary knob 14 when the annular sheet 22 is fixed with the annular sheet 22 being interposed between the flange portion 24b of the attachment member 24 and the annular protrusion 13 of the case 50. As illustrated in FIG. 1, the body-side protrusion 26 is an annular rib formed on the front surface of the annular protrusion 13. The body-side protrusion 26 is formed to contact the annular sheet 22 on the outside of the fixed portion 22a positioned inside in the radial direction of the annular sheet 22, thereby forming an imaginary continuous ring of contact 56 (labeled in FIG. 3b) on an outside of the fixed portion 22a in a radial direction of the annular sheet 22.

As illustrated in FIG. 3, the annular sheet 22—which includes an example of an annular surface 23 and an annular surface 25 (an example of an axially opposite surface that faces axially away from the annular surface 23)—is attached to the device body in the state in which the fixed portion 22a positioned inside in the radial direction is interposed between the annular protrusion 13 and the attachment member 24. The annular surface 23 of the annular sheet 22 contacts the body-side protrusion 26 on the outside of the fixed portion 22a in the radial direction to warp toward the rotary knob 14. For example, in the embodiment illustrated in FIG. 3a the body-side protrusion 26 warps an outside of, including radially outer ends 27 and 29 of, each of the annular surface 23 and the axially opposite surface 25. Moreover, the annular sheet 22 contacts the sliding portion 16c of the inner cylindrical portion 16 on the outside of the body-side protrusion 26 in the radial direction. With this configuration, the rotary knob 14 is, by the annular sheet 22, biased in the direction away from the device body. Moreover, the sliding portion 16c is formed to slide on the annular sheet 22 in the above-described biased state. The sliding portion 16c slides on the annular sheet 22 to provide rotational resistance to the rotary knob 14.

According to the rotational structure of the first embodiment, the biasing force of the annular sheet 22 can reduce backlash of the rotary knob 14 which a suitable magnitude of rotational resistance can be provided to the rotary knob 14. Moreover, since the rotary knob 14 is biased in the direction away from the device body in the state in which the annular sheet 22 warps, variation in the dimensions of the rotary knob 14 can be absorbed according to the degree of warpage of the annular sheet 22. Thus, the influence of variation in the dimensions of the rotary knob 14 can be reduced.

Figure 4B:
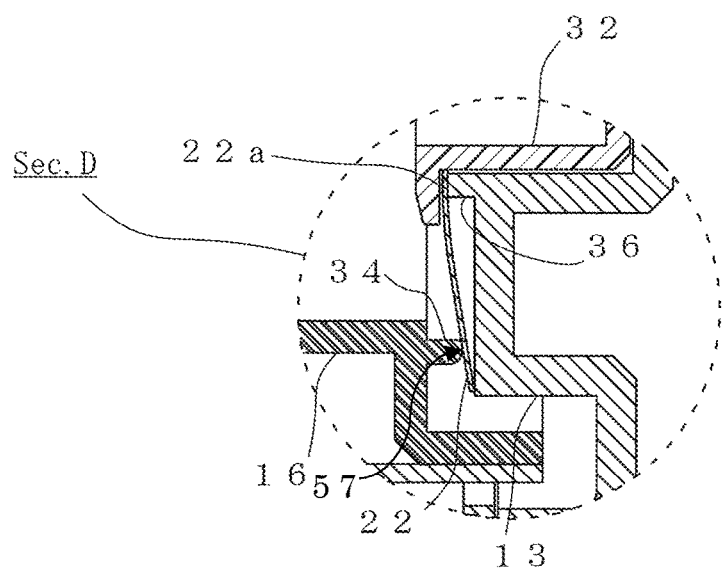

Next, a rotary knob rotational structure of a second embodiment will be described with reference to FIG. 4. FIG. 4 is a cross-sectional view of the rotary knob rotational structure. In particular, differences from the above-described configuration of the first embodiment will be described in detail below. The same reference numerals as those used in the first embodiment are used to represent equivalent elements in the second embodiment, and description thereof will not be repeated.

As illustrated in FIG. 4, the rotational structure of the present embodiment is different from that of the first embodiment in that while rotational resistance is being provided to a rotary knob 14—with an example of a central axis A (identified in FIG. 4a)—with an annular sheet 22 warping toward a device body, backlash is reduced. The rotational structure of the present embodiment includes an annular sheet 22 and an attachment member 32.

The attachment member 32 has the substantially same configuration as that of the attachment member 24. The attachment member 32 has the function of attaching an inner fixed portion 22a of the annular sheet 22 to the device body in the state in which the fixed portion 22a is interposed between the attachment member 32 and a protrusion 36 provided on an annular protrusion 13. The protrusion 36 is formed in an annular shape on the inner end of the annular protrusion 13 in the radial direction thereof.

The rotational structure includes a sliding portion 34 formed as an annular rib on the back end surface of an inner cylindrical portion 16 of the rotary knob 14. The sliding portion 34 is formed to have a longer protrusion length than that of the sliding portion 16c of the first embodiment. The sliding portion 34 has the function of contacting the annular sheet 22 on the outside of the fixed portion 22a in the radial direction of the annular sheet 22 to warp the annular sheet 22 toward the device body. The contact between the annular sheet 22 and the sliding portion 34 forms an imaginary continuous ring of contact 57 (labeled in FIG. 4b) on an outside of the fixed portion 22a in a radial direction of the annular sheet 22. The annular sheet 22 includes an annular surface 23 and an annular surface 25—the annular surface 23 being an example of an axially opposite surface that faces axially away from the annular surface 25. For example, in the embodiment illustrated in FIG. 4, the sliding portion 34 warps an outside of, including radially outer ends 27 and 29 of, each annular surface 23 and an annular surface 25.

According to the rotary knob rotational structure of the second embodiment, the annular sheet 22 interposed between the device body and the attachment member 32 warps toward the device body, and therefore, the annular sheet 22 can bias the rotary knob 14 in the direction away from the device body. Moreover, in such a biased state, the sliding portion 34 of the rotary knob 14 slides on the annular sheet 22 so that rotational resistance can be provided to the rotary knob 14. With this configuration, the biasing force of the annular sheet 22 can reduce backlash of the rotary knob 14 while a suitable magnitude of rotational resistance can be provided to the rotary knob 14. Moreover, since the rotary knob 14 is biased in the direction away from the device body in the state in which the annular sheet 22 warps, variation in the dimensions of the rotary knob 14 can be absorbed according to the degree of warpage of the annular sheet 22. Thus, the influence of variation in the dimensions of the rotary knob 14 can be reduced.

The rotary knob rotational structure of the present invention is not limited to the configurations of the above-described embodiments and variations thereof. Needless to say, various modifications and changes can be made within the scope of the claims and equivalents thereof.

What is claimed is:

1. A rotational structure for a rotary knob attached to a rotary shaft rotatably provided at a device body, the rotational structure providing rotational resistance to the rotary knob, comprising:
    an annular sheet interposed between the device body and the rotary knob, wherein the annular sheet includes an annular surface and an axially opposite surface facing axially away from the annular surface;
    an attachment member configured to attach a fixed portion of the annular sheet to the device body with the fixed portion being interposed between the attachment member and the device body; and
    an annular body-side protrusion provided at the device body, wherein the annular body-side protrusion and the annular surface of the annular sheet are in contact, about a central axis of the rotary knob, thereby forming an imaginary continuous ring of contact on an outside of the fixed portion in a radial direction of the annular sheet, wherein the annular body-side protrusion is configured to warp each of the annular surface and the axially opposite surface toward the rotary knob, and wherein the annular body-side protrusion includes an annular rib in contact with the annular surface of the annular sheet thereby forming the imaginary continuous ring of contact,
    wherein the rotary knob contacts the annular sheet on an outside of the annular rib in the radial direction of the annular sheet, such that warpage of the annular sheet biases the rotary knob in a direction away from the device body, and is configured to, in a biased state, slide on the annular sheet such that when the rotary knob rotates the contact between the rotary knob and the annular sheet provides the rotational resistance to the rotary knob.

2. The rotational structure for a rotary knob of claim 1, wherein the fixed portion of the annular sheet is disposed axially inward toward the device body relative to an outside of the annular sheet along the central axis of the rotary knob.

3. The rotational structure for a rotary knob of claim 1, wherein the annular sheet is axially interposed between the attachment member and the annular body-side rib along the central axis of the rotary knob.

4. The rotational structure for a rotary knob of claim 1, wherein the attachment member is spaced from contact with the rotary knob.

5. The rotational structure for a rotary knob of claim 1, wherein the annular rib uniformly warps the annular sheet toward the rotary knob.

6. The rotational structure for a rotary knob of claim 1, wherein a portion of the rotary knob is separate from the attachment member and in contact with the annular sheet.

7. The rotational structure for a rotary knob of claim 1, wherein the rotary knob contacts the annular sheet radially outward of a radially outermost portion of the annular rib.

8. A rotational structure for a rotary knob attached to a rotary shaft rotatably provided at a device body, the rotational structure providing rotational resistance to the rotary knob, comprising:
   an annular sheet interposed between the device body and the rotary knob, wherein the annular sheet includes an annular surface and an axially opposite surface facing axially away from the annular surface;
   an attachment member configured to attach a fixed portion of the annular sheet to the device body with the fixed portion being interposed between the attachment member and a protrusion of the device body; and
   an annular sliding portion provided at the rotary knob, wherein the annular sliding portion and the annular surface of the annular sheet are in contact, about a central axis of the rotary knob, thereby forming an imaginary continuous ring of contact on an outside of the fixed portion in a radial direction of the annular sheet, wherein the annular sliding portion is configured to warp an outside of, including a radially outer end of, each of the annular surface and the axially opposite surface sheet toward the device body, and wherein the annular sliding portion includes an annular rib in contact with the annular surface of the annular sheet thereby forming the imaginary continuous ring of contact, and
   the rotary knob is biased in a direction away from the device body in such a manner that the annular sheet contacts the annular rib, and in a biased state, and when the rotary knob rotates the annular rib slides on the annular sheet and the contact between the annular rib and the annular sheet provides the rotational resistance to the rotary knob.

9. The rotational structure for a rotary knob of claim 8, wherein the fixed portion of the annular sheet is disposed axially outward toward the rotary knob relative to an outside of the annular sheet along the central axis of the rotary knob.

10. The rotational structure for a rotary knob of claim 8, wherein the fixed portion of the annular sheet is axially interposed between the attachment member and a body-side protrusion provided at the device body along the central axis of the rotary knob.

11. The rotational structure for a rotary knob of claim 8, wherein the attachment member is spaced from contact with the rotary knob.

12. The rotational structure for a rotary knob of claim 8, wherein the annular rib uniformly warps the annular sheet toward the device body.

13. The rotational structure for a rotary knob of claim 8, wherein the entire rotary knob is biased in a direction away from the device body via contact with the annular sheet.

14. A rotational structure for a rotary knob attached to a rotary shaft rotatably provided at a device body, the rotational structure providing rotational resistance to the rotary knob, comprising:
   an annular sheet interposed between the device body and the rotary knob, wherein the annular sheet includes an annular surface and an axially opposite surface facing axially away from the annular surface;
   an attachment member configured to attach a fixed portion of the annular sheet to the device body with the fixed portion being interposed between the attachment member and the device body, wherein the attachment member is spaced from contact with the rotary knob; and
   an annular portion provided at the rotary knob or at the device body, wherein the annular portion and the annular surface of the annular sheet are in contact, about a central axis of the rotary knob, thereby forming an imaginary continuous ring of contact on an outside of the fixed portion in a radial direction of the annular sheet, wherein the annular portion is configured to warp an outside of, including a radially outer end of, each of the annular surface and the axially opposite surface in the same axial direction, and wherein the annular portion includes an annular rib in contact with the annular surface of the annular sheet thereby forming the imaginary continuous ring of contact,
   wherein the rotary knob is in contact with the annular sheet on the outside of the fixed portion in the radial direction of the annular sheet, wherein the rotary knob is biased in a direction away from the device body via contact with the annular sheet, and wherein the rotary knob is configured to, in a biased state, slide on the annular sheet such that when the rotary knob rotates the contact between the rotary knob and the annular sheet provides the rotational resistance to the rotary knob.

15. The rotational structure for a rotary knob of claim 14, wherein the annular rib uniformly warps the annular sheet.

16. The rotational structure for a rotary knob of claim 14, wherein the fixed portion is interposed axially between the attachment member and the device body.

17. The rotational structure for a rotary knob of claim 14, wherein the entire rotary knob is biased in a direction away from the device body via contact with the annular sheet.

* * * * *